United States Patent
Kunnath et al.

(10) Patent No.: US 11,442,837 B2
(45) Date of Patent: Sep. 13, 2022

(54) MONITORING LONG RUNNING WORKFLOWS FOR ROBOTIC PROCESS AUTOMATION

(71) Applicant: UiPath, Inc., New York, NY (US)

(72) Inventors: Liji J. Kunnath, Bangalore (IN); Remus Rusanu, Redmond, WA (US); Arghya Chakrabarty, Kolkata (IN)

(73) Assignee: UiPath, Inc., New York, NY (US)

( * ) Notice: Subject to any disclaimer, the term of this patent is extended or adjusted under 35 U.S.C. 154(b) by 167 days.

(21) Appl. No.: 16/716,737

(22) Filed: Dec. 17, 2019

(65) Prior Publication Data

US 2021/0133078 A1    May 6, 2021

(30) Foreign Application Priority Data

Nov. 1, 2019    (IN) .............................. 201911044384

(51) Int. Cl.
| | | |
|---|---|---|
| *G06F 11/00* | (2006.01) | |
| *G06F 11/34* | (2006.01) | |
| *G06F 16/904* | (2019.01) | |
| *G06F 9/455* | (2018.01) | |

(52) U.S. Cl.
CPC ...... *G06F 11/3476* (2013.01); *G06F 9/45512* (2013.01); *G06F 11/3495* (2013.01); *G06F 16/904* (2019.01)

(58) Field of Classification Search
CPC .................................................. G06F 11/3476
USPC .......................................................... 714/45
See application file for complete search history.

(56) References Cited

U.S. PATENT DOCUMENTS

| | | |
|---|---|---|
| 8,375,389 B2 | 2/2013 | Allen et al. |
| 9,754,231 B2 | 9/2017 | Channabasavaiah et al. |
| 10,289,783 B1* | 5/2019 | Khanna ............. G06Q 10/0631 |
| 10,372,508 B2 | 8/2019 | Hosabettu et al. |
| 2010/0064357 A1 | 3/2010 | Baird et al. |
| 2017/0270431 A1 | 9/2017 | Hosabettu et al. |
| 2018/0197123 A1* | 7/2018 | Parimelazhagan .......................... G06Q 10/0633 |
| 2018/0232204 A1 | 8/2018 | Ghatage et al. |
| 2019/0066013 A1 | 2/2019 | Gupta et al. |
| 2019/0087395 A1 | 3/2019 | Priestas et al. |
| 2019/0147382 A1 | 5/2019 | Krishnamurthy |
| 2019/0155225 A1 | 5/2019 | Kothandaraman et al. |

OTHER PUBLICATIONS

"Long Running Workflow—Human Interaction," initially retrieved online on Aug. 30, 2019, at https://www.flexrule.com/process-automation/, 5 pgs.

"RPA—Robotics Automation Process," initially retrieved online on Aug. 29, 2019, at https://www.flexrule.com/robotics/?q=/rpa/&, 4 pgs.

(Continued)

*Primary Examiner* — Timothy A Mudrick
(74) *Attorney, Agent, or Firm* — Chiesa Shahinian & Giantomasi PC

(57) ABSTRACT

Systems and methods for monitoring a robotic process automation (RPA) system are provided. Job execution data for one or more jobs in the RPA system is determined based on logs of the RPA system. The job execution data for the one or more jobs in the RPA system is caused to be displayed in substantially real time.

27 Claims, 11 Drawing Sheets

(56) References Cited

OTHER PUBLICATIONS

"Managed Roc—Robotic Operations Center," Accelirate Inc., initially retrieved online on Aug. 29, 2019, at https://www.accelirate.com/wp-content/uploads/2019/01/Managed-ROC.pdf, 2 pgs.
"User Guide—Kryon Console v5.19," Kryon Systems Ltd., initially retrieved online on Aug. 29, 2019, at https://us.v-cdn.net/6030908/uploads/editor/8h/t3jiixqx97t2.pdf, 89 pgs.
"Understanding the RPA Monitor BOTs View," initially retrieved online on Aug. 29, 2019, at https://jacada.zendesk.com/hc/en-us/articles/360001675452, 5 pgs.
"Pega Robot Manager," Pegasystems, Inc., initially retrieved online on Sep. 9, 2019, at https://community.pega.com/marketplace/components/pega-robot-manager, 4 pgs.
"Intellibot RPA Platform," Uber Techlabs, initially retrieved online on Sep. 9, 2019, at https://intellibot.io/, 10 pgs.
"Robotic Process Automation (RPA)," NICE Robotic Automation, initially retrieved online on Sep. 5, 2019, at https://www.nice.com/websites/rpa/robotic-automation.html. 7 pgs.
YouTube Video "Power Your Document Processes with RPA," Kofax, Inc., uploaded on Nov. 8, 2018, initially retrieved online on Sep. 5, 2019, at https://www.youtube.com/watch?v=cvCxM2mYeCo, Digital Video, 1 pgs.

\* cited by examiner

MONITORING LONG RUNNING WORKFLOWS FOR ROBOTIC PROCESS AUTOMATION

TECHNICAL FIELD

The present invention relates generally to robotic process automation, and more particularly to monitoring long running workflows for robotic process automation.

BACKGROUND

Robotic process automation (RPA) is a form of process automation that uses software robots to automate workflows. RPA may be implemented to automate repetitive and/or labor-intensive tasks, thereby reducing costs and increasing efficiency. At times, robots executing a workflow may become idle due to bottlenecks in the workflow. For example, robots executing long running workflows often become idle while waiting for a user or another robot to complete other activities or workflows. It is therefore important to monitor the performance and efficiency of robots. However, it is difficult to identify the occurrence of, and the reason for, bottlenecks or other issues where a large number of robots have been deployed.

BRIEF SUMMARY OF THE INVENTION

In accordance with one or more embodiments, systems and methods for monitoring a robotic process automation (RPA) system are provided. Job execution data for one or more jobs in the RPA system is determined based on logs of the RPA system. The job execution data for the one or more jobs in the RPA system is caused to be displayed in substantially real time.

In one embodiment, the job execution data is caused to be displayed with respect to a visualization of a workflow associated with the one or more jobs. For example, a number of idle jobs for an activity of the workflow, a number of jobs that have traversed one or more paths of the workflow, a name of a robot assigned to perform an activity of the workflow, a completion time of an activity of the workflow, or an idle time of an activity of the workflow may be caused to be displayed. In another embodiment, a color for each respective job is caused to be displayed, where the color for the respective job corresponds to a state of the respective job.

These and other advantages of the invention will be apparent to those of ordinary skill in the art by reference to the following detailed description and the accompanying drawings.

DETAILED DESCRIPTION

Figure 1:
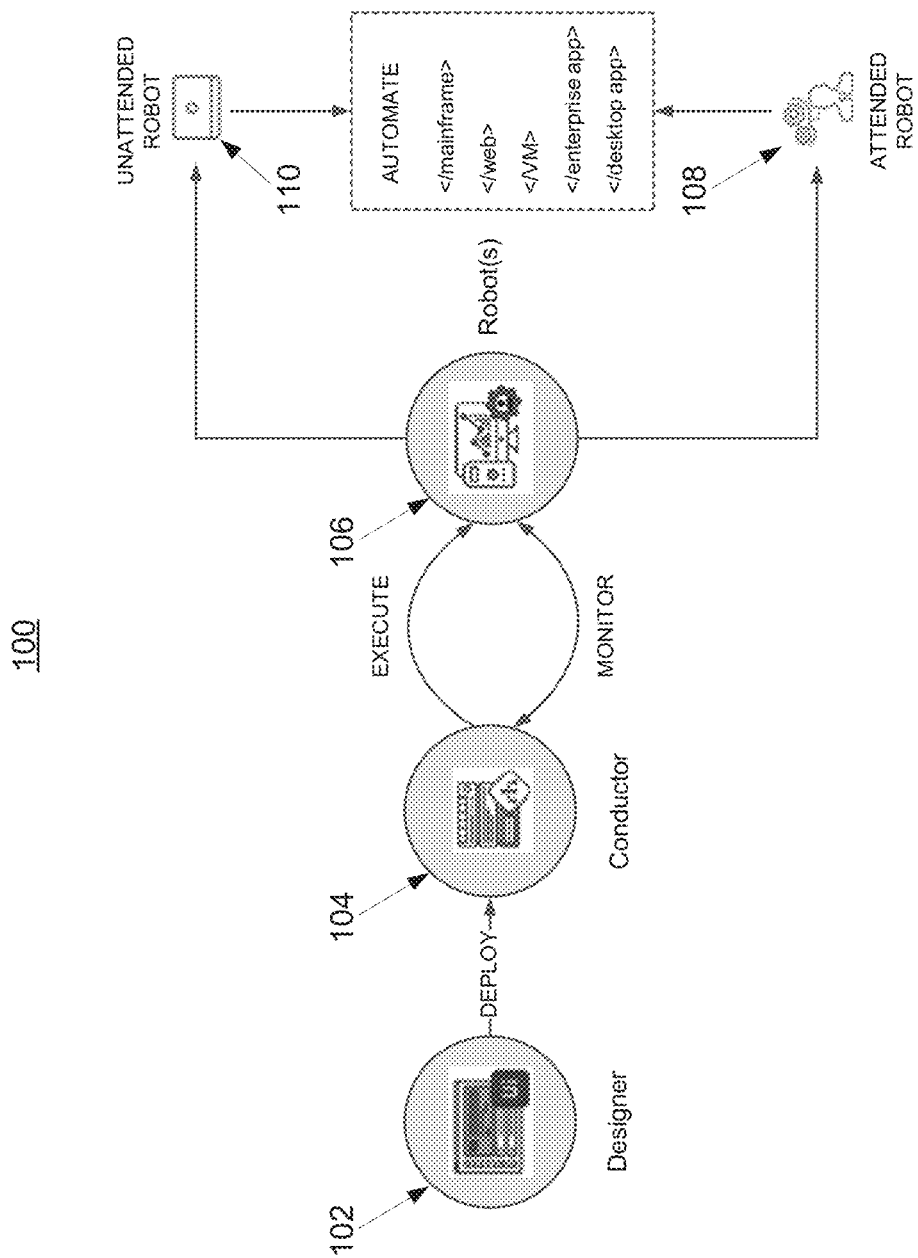
FIG. 1 is an architectural diagram illustrating a robotic process automation (RPA) system, according to an embodiment of the invention.

Robotic process automation (RPA) is used for automating workflows. FIG. 1 is an architectural diagram of an RPA system 100, in accordance with one or more embodiments. As shown in FIG. 1, RPA system 100 includes a designer 102 to allow a developer to design automation processes using workflows. More specifically, designer 102 facilitates the development and deployment of workflows and robots for performing activities in the workflows. Designer 102 may provide a solution for application integration, as well as automating third-party applications, administrative Information Technology (IT) tasks, and business processes for contact center operations. One commercial example of an embodiment of designer 102 is UiPath Studio™.

In designing the automation of rule-based processes, the developer controls the execution order and the relationship between a custom set of steps developed in a workflow, defined herein as "activities." Each activity may include an action, such as clicking a button, reading a file, writing to a log panel, etc. In some embodiments, workflows may be nested or embedded.

Some types of workflows may include, but are not limited to, sequences, flowcharts, Finite State Machines (FSMs), and/or global exception handlers. Sequences may be particularly suitable for linear processes, enabling flow from one activity to another without cluttering a workflow. Flowcharts may be particularly suitable to more complex business logic, enabling integration of decisions and connection of activities in a more diverse manner through multiple branching logic operators. FSMs may be particularly suitable for large workflows. FSMs may use a finite number of states in their execution, which are triggered by a condition (i.e., transition) or an activity. Global exception handlers may be particularly suitable for determining workflow behavior when encountering an execution error and for debugging processes.

Once a workflow is developed in designer 102, execution of business processes is orchestrated by a conductor 104, which orchestrates one or more robots 106 that execute the workflows developed in designer 102. One commercial example of an embodiment of conductor 104 is UiPath Orchestrator™. Conductor 220 facilitates management of the creation, monitoring, and deployment of resources in an RPA environment. In one example, conductor 104 is a web application. Conductor 104 may also function as an integration point with third-party solutions and applications.

Conductor 104 may manage a fleet of robots 106 by connecting and executing robots 106 from a centralized point. Conductor 104 may have various capabilities including, but not limited to, provisioning, deployment, configuration, queueing, monitoring, logging, and/or providing interconnectivity. Provisioning may include creation and maintenance of connections between robots 106 and conductor 104 (e.g., a web application). Deployment may include assuring the correct delivery of package versions to assigned robots 106 for execution. Configuration may include maintenance and delivery of robot environments and process configurations. Queueing may include providing management of queues and queue items. Monitoring may include keeping track of robot identification data and maintaining user permissions. Logging may include storing and indexing logs to a database (e.g., an SQL database) and/or another storage mechanism (e.g., ElasticSearch®, which provides the ability to store and quickly query large datasets). Conductor 104 may provide interconnectivity by acting as the centralized point of communication for third-party solutions and/or applications.

Robots 106 are execution agents that run workflows built in designer 102. One commercial example of some embodiments of robots 106 is UiPath Robots™. Types of robots 106 may include, but are not limited to, attended robots 108 and unattended robots 110. Attended robots 108 are triggered by a user or user events and operate alongside a human user on the same computing system. Attended robots 108 may help the human user accomplish various tasks, and may be triggered directly by the human user and/or by user events. In the case of attended robots, conductor 104 may provide centralized process deployment and a logging medium. In certain embodiments, attended robots 108 can only be started from a "robot tray" or from a command prompt in a web application. Unattended robots 110 operate in an unattended mode in virtual environments and can be used for automating many processes, e.g., for high-volume, back-end processes and so on. Unattended robots 110 may be responsible for remote execution, monitoring, scheduling, and providing support for work queues. Both attended and unattended robots may automate various systems and applications including, but not limited to, mainframes, web applications, VMs, enterprise applications (e.g., those produced by SAP®, SalesForce®, Oracle®, etc.), and computing system applications (e.g., desktop and laptop applications, mobile device applications, wearable computer applications, etc.).

In some embodiments, robots 106 install the Microsoft Windows® Service Control Manager (SCM)-managed service by default. As a result, such robots 106 can open interactive Windows® sessions under the local system account, and have the rights of a Windows® service. In some embodiments, robots 106 can be installed in a user mode with the same rights as the user under which a given robot 106 has been installed.

Robots 106 in some embodiments are split into several components, each being dedicated to a particular task. Robot components in some embodiments include, but are not limited to, SCM-managed robot services, user mode robot services, executors, agents, and command line. SCM-managed robot services manage and monitor Windows® sessions and act as a proxy between conductor 104 and the execution hosts (i.e., the computing systems on which robots 106 are executed). These services are trusted with and manage the credentials for robots 106. A console application is launched by the SCM under the local system. User mode robot services in some embodiments manage and monitor Windows® sessions and act as a proxy between conductor 104 and the execution hosts. User mode robot services may be trusted with and manage the credentials for robots 106. A Windows® application may automatically be launched if the SCM-managed robot service is not installed. Executors may run given jobs under a Windows® session (e.g., they may execute workflows) and they may be aware of per-monitor dots per inch (DPI) settings. Agents may be Windows® Presentation Foundation (WPF) applications that display the available jobs in the system tray window. Agents may be a client of the service. Agents may request to start or stop jobs and change settings. Command line is a client of the service and is a console application that can request to start jobs and waits for their output. Splitting robot components can help developers, support users, and enable computing systems to more easily run, identify, and track what each robot component is executing. For example, special behaviors may be configured per robot component, such as setting up different firewall rules for the executor and the service. As a further example, an executor may be aware of DPI settings per monitor in some embodiments and, as a result, workflows may be executed at any DPI regardless of the configuration of the computing system on which they were created.

Figure 2:
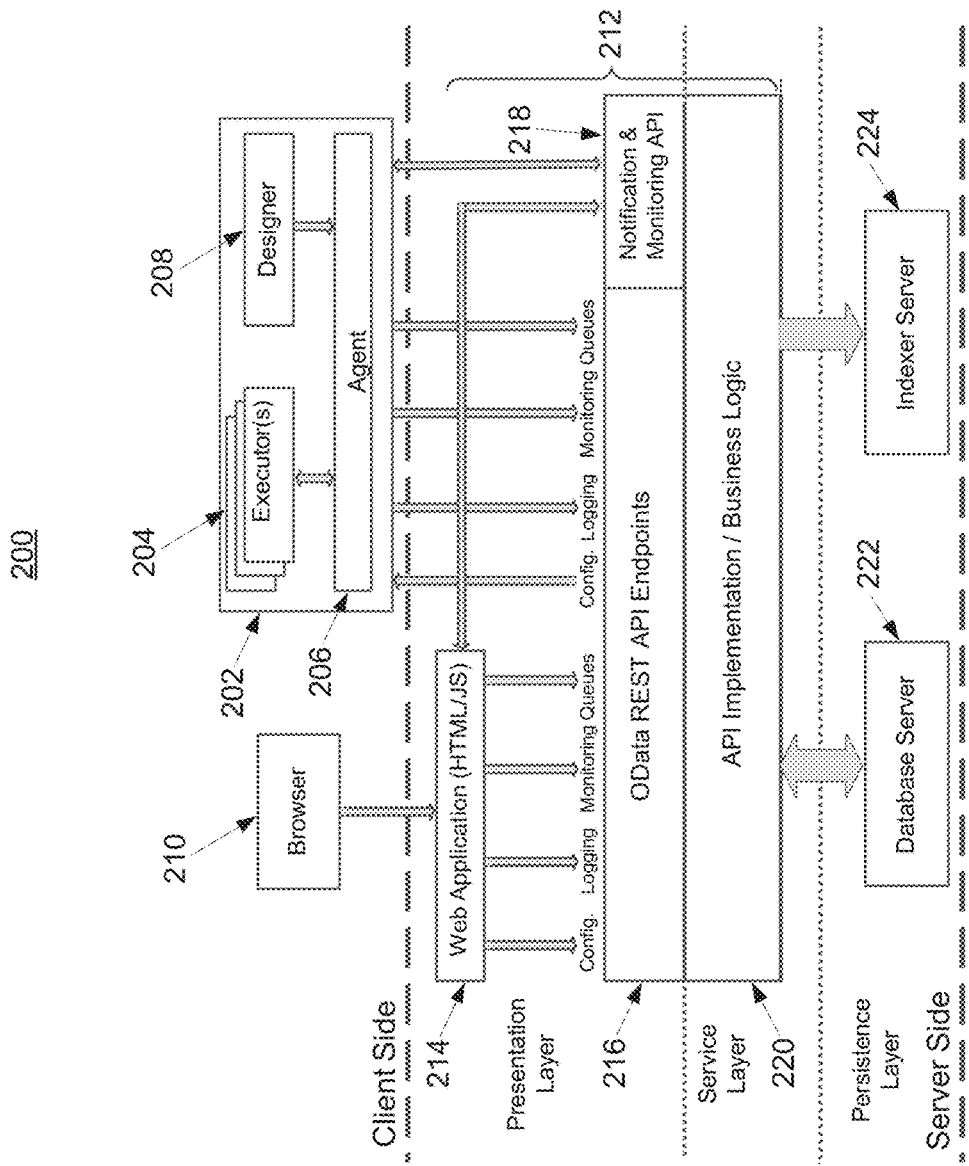
FIG. 2 is an architectural diagram illustrating an example of a deployed robotic process automation system, according to an embodiment of the invention.

FIG. 2 shows an RPA system 200, in accordance with one or more embodiments. RPA system 200 may be, or may be part of, RPA system 100 of FIG. 1. It should be noted that the "client side", the "server side", or both, may include any desired number of computing systems without deviating from the scope of the invention.

As shown on the client side in this embodiment, computing system 202 includes one or more executors 204, agent 206, and designer 208. In other embodiments, designer 208 may not be running on the same computing system 202. An executor 204 (which may be a robot component as described above) runs a process and, in some embodiments, multiple business processes may run simultaneously. In this example, agent 206 (e.g., a Windows® service) is the single point of contact for managing executors 204.

In some embodiments, a robot represents an association between a machine name and a username. A robot may manage multiple executors at the same time. On computing systems that support multiple interactive sessions running simultaneously (e.g., Windows® Server 2012), multiple robots may be running at the same time (e.g., a high density (HD) environment), each in a separate Windows® session using a unique username.

Agent 206 is also responsible for sending the status of the robot (e.g., periodically sending a "heartbeat" message indicating that the robot is still functioning) and downloading the required version of the package to be executed. The communication between agent 206 and conductor 212 is initiated by agent 206 in some embodiments. In the example of a notification scenario, agent 206 may open a WebSocket channel that is later used by conductor 212 to send commands to the robot (e.g., start, stop, etc.).

As shown on the server side in this embodiment, a presentation layer comprises web application 214, Open Data Protocol (OData) Representative State Transfer (REST) Application Programming Interface (API) endpoints 216 and notification and monitoring API 218. A service layer on the server side includes API implementation/business logic 220. A persistence layer on the server side includes database server 222 and indexer server 224. Conductor 212 includes web application 214, OData REST API endpoints 216, notification and monitoring API 218, and API implementation/business logic 220.

In various embodiments, most actions that a user performs in the interface of conductor 212 (e.g., via browser 210) are performed by calling various APIs. Such actions may include, but are not limited to, starting jobs on robots, adding/removing data in queues, scheduling jobs to run unattended, and so on. Web application 214 is the visual layer of the server platform. In this embodiment, web application 214 uses Hypertext Markup Language (HTML) and JavaScript (JS). However, any desired markup languages, script languages, or any other formats may be used without deviating from the scope of the invention. The user interacts with web pages from web application 214 via browser 210 in this embodiment in order to perform various actions to control conductor 212. For instance, the user may create robot groups, assign packages to the robots, analyze logs per robot and/or per process, start and stop robots, etc.

In addition to web application 214, conductor 212 also includes a service layer that exposes OData REST API endpoints 216 (or other endpoints may be implemented without deviating from the scope of the invention). The REST API is consumed by both web application 214 and agent 206. Agent 206 is the supervisor of one or more robots on the client computer in this exemplary configuration.

The REST API in this embodiment covers configuration, logging, monitoring, and queueing functionality. The configuration REST endpoints may be used to define and configure application users, permissions, robots, assets, releases, and environments in some embodiments. Logging REST endpoints may be useful for logging different information, such as errors, explicit messages sent by the robots, and other environment-specific information, for example. Deployment REST endpoints may be used by the robots to query the package version that should be executed if the start job command is used in conductor 212. Queueing REST endpoints may be responsible for queues and queue item management, such as adding data to a queue, obtaining a transaction from the queue, setting the status of a transaction, etc. Monitoring REST endpoints monitor web application 214 and agent 206. Notification and monitoring API 218 may be REST endpoints that are used for registering agent 206, delivering configuration settings to agent 206, and for sending/receiving notifications from the server and agent 206. Notification and monitoring API 218 may also use WebSocket communication in some embodiments.

The persistence layer on the server side includes a pair of servers in this illustrative embodiment—database server 222 (e.g., a SQL server) and indexer server 224. Database server 222 in this embodiment stores the configurations of the robots, robot groups, associated processes, users, roles, schedules, etc. This information is managed through web application 214 in some embodiments. Database server 222 may also manage queues and queue items. In some embodiments, database server 222 may store messages logged by the robots (in addition to or in lieu of indexer server 224). Indexer server 224, which is optional in some embodiments, stores and indexes the information logged by the robots. In certain embodiments, indexer server 224 may be disabled through configuration settings. In some embodiments, indexer server 224 uses ElasticSearch®, which is an open source project full-text search engine. Messages logged by robots (e.g., using activities like log message or write line) may be sent through the logging REST endpoint(s) to indexer server 224, where they are indexed for future utilization.

Figure 3:
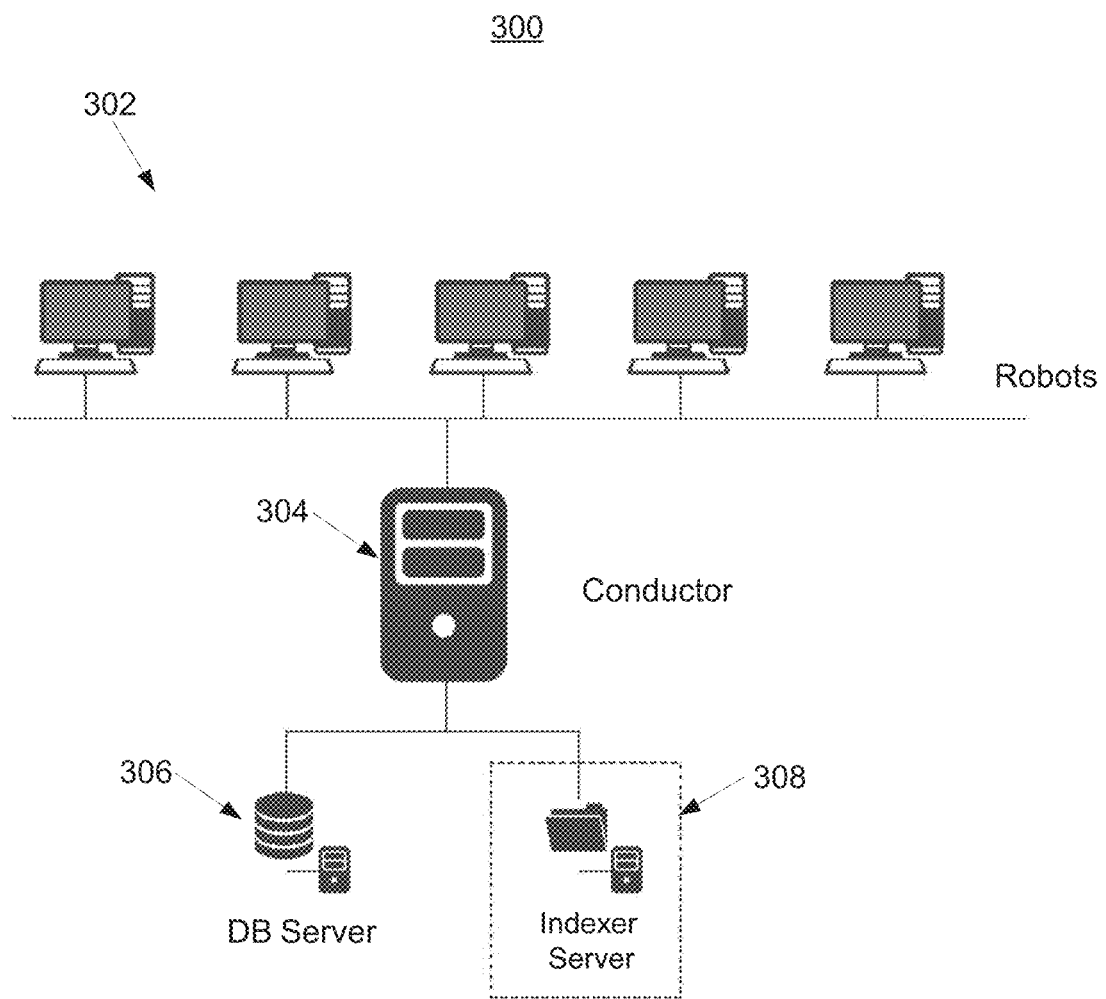
FIG. 3 is an architectural diagram illustrating a simplified deployment example of a robotic process automation system, according to an embodiment of the invention.

FIG. 3 is an architectural diagram illustrating a simplified deployment example of RPA system 300, in accordance with one or more embodiments. In some embodiments, RPA system 300 may be, or may include RPA systems 100 and/or 200 of FIGS. 1 and 2, respectively. RPA system 300 includes multiple client computing systems 302 running robots. Computing systems 302 are able to communicate with a conductor computing system 304 via a web application running thereon. Conductor computing system 304, in turn, communicates with database server 306 and an optional indexer server 308. With respect to FIGS. 2 and 3, it should be noted that while a web application is used in these embodiments, any suitable client/server software may be used without deviating from the scope of the invention. For instance, the conductor may run a server-side application that communicates with non-web-based client software applications on the client computing systems.

In one embodiment, conductor 304 facilitates the monitoring of jobs in RPA system 300. As used herein, a job in RPA system 300 represents a request (e.g., from a user) to perform one or more workflows (also referred to as processes). Each workflow includes one or more activities. In one embodiment, the workflows may include a long running workflow. A long running workflow is a workflow that includes one or more activities that depend on an occurrence of an external event in order to complete the activity. An external event of a particular long running workflow is any event that does not result from execution of the particular long running workflow. Exemplary activities that depend on an occurrence of an external event include a robot activity that depends on the completion of another workflow by a robot or user activity that depends on input from a user. Long running workflows are performed over a relatively long period of time (e.g., hours or days) and may be suspended and resumed at any point in time, thereby providing long running behavior to the workflow.

Conductor 304 provides for a user interface for monitoring jobs in RPA system 300 in substantially real time. In one embodiment, conductor 304 enables workflow centric monitoring by providing, e.g., a summary of currently executing long running workflows, a cumulative status of related jobs, a path taken by completed and in progress jobs, and resource bottlenecks, average times, and other metrics of a job. By providing such monitoring of jobs, embodiments of the invention allow an end user to identify faulted jobs for further action and to manage and oversee the performance of a workflow through various metrics (e.g., average processing time) to achieve a target objective.

Figure 4:
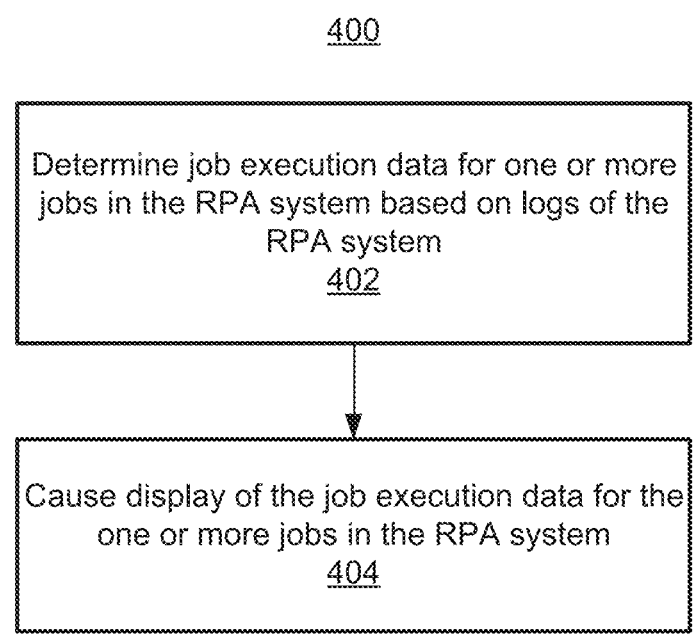
FIG. 4 shows a method for monitoring jobs in an RPA system, according to an embodiment of the invention.

FIG. 4 shows a method 400 for monitoring jobs in an RPA system, in accordance with one or more embodiments. Method 400 may be performed by any suitable computing device (e.g., computing system 1100 of FIG. 11). In one embodiment, method 400 is performed by an orchestrator, such as, e.g., conductor 104 of FIG. 1, conductor 212 of FIG. 2, or conductor 304 of FIG. 3.

At step 402, job execution data of one or more jobs in the RPA system is determined based on logs of the RPA system. In one embodiment, the job execution data is additionally or alternatively determined based on metadata of jobs, such as, e.g., the current status of jobs, triggers that jobs having a suspended status are waiting for, or any other suitable metadata of jobs. As used herein, job execution data of a job refers to any data relating to the execution of the job. Various examples of job execution data of jobs are shown in FIGS. 5-10, which are described in further detail below. The job execution data of the jobs may be determined in substantially real time.

In one embodiment, the job execution data of the jobs may be a state (or status) of the jobs. For example, the state of the jobs may be one of running, pending, idle, successful, stopped, or faulted. The state of a job is idle if one or more persistent activities of a workflow of the job is pending or running. The idle state of the job can change to a running, faulted, or successful state. The state of the job may be determined based on the metadata of the jobs (e.g., a timestamp since the workflow was in a suspended state). The job execution data of the jobs may be a number of jobs that are in one or more state (e.g., the number of jobs that are in a running state, a pending state, and an idle state). The number of jobs in each state may be identified for each workflow in the RPA system. In another embodiment, the job execution data may be displayed with respect to a visualization of a workflow associated with the jobs. For example, the job execution data of the jobs may be the number of jobs that traverse each path in the workflow or the number of jobs at a particular state (e.g., idle) at each activity of the workflow. In another embodiment, the job execution data of the jobs may be a metric for the jobs, such as, e.g., average job duration or average pending time.

The job execution data of the jobs may be determined from logs maintained for any component of the RPA system, such as, e.g., logs for robots, an orchestrator, or task management. In one embodiment, the logs may be logs that are already maintained by the RPA system for purposes other than monitoring, and are not logs generated for the sole purpose of monitoring.

At step 404, the job execution data of the one or more jobs in the RPA system is caused to be displayed. In one embodiment, the job execution data of the one or more jobs may be caused to be displayed to an end user in substantially real time via a browser user interface. For example, the end user may use a web browser executing on a computing device (e.g., computing system 1100 of FIG. 11) to access the orchestrator via a browser user interface to view and interact with a user interface displaying the job execution data of the one or more jobs, without having to directly access the designer (e.g., designer 102 of FIG. 1 or designer 208 of FIG. 2) of the RPA system. In one embodiment, the user interfaces shown in FIGS. 5-10 (described in further detail below) are caused to be displayed.

In one embodiment, the browser user interface may be generated from an XAML file output from the designer (e.g., designer 102 of FIG. 1 or designer 208 of FIG. 2) using a typescript based application (compiled to Javascript library). The application uses a template generation model, which is converted to a workflow visualization of activities and connectors (e.g., using Dagree-D3). Each activity block in a workflow has a unique identifier and, through the template, can identify all activities (including long running activities), and overlay state data (or any other type of data) of the activities by applying custom CSS (cascading style sheets), as well as additional formatting of the blocks in the workflow, thus providing a real time monitoring view of workflows.

Advantageously, embodiments of the invention enable end users to identify faulted jobs causing bottlenecks in a workflow for further action, while managing and overseeing performance of the workflows through various metrics to ensure that a target objective is achieved. Further, embodiments of the invention enable end users to review and improve the quality of the workflows.

Figure 5:
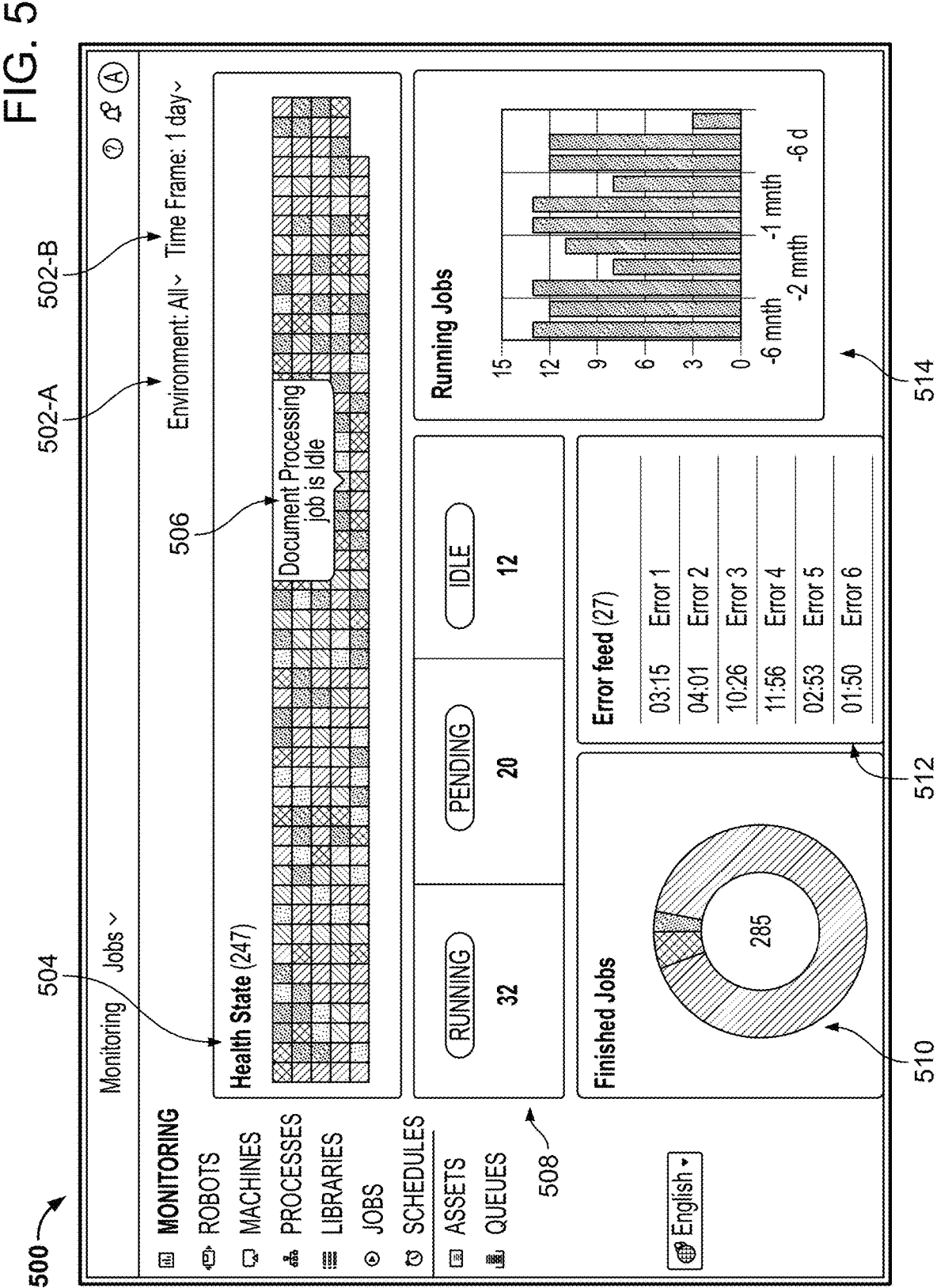
FIG. 5 shows a user interface depicting a summary of job execution data for jobs in an RPA system, according to an embodiment of the invention.

FIG. 5 shows a user interface 500 depicting a summary of job execution data for jobs in an RPA system, in accordance with one or more embodiments. User interface 500 may be caused to be displayed to an end user at step 404 of method 400 of FIG. 4. The job execution data shown in user interface 500 may be filtered according to various filtering criteria, including an environment criterion 502-A and a time frame criterion 502-B.

Health state view 504 depicts a state (e.g., running, pending, idle, successful, stopped, or faulted) of each job in the RPA system. Each job may be represented in health state view 504 by a respective square (or other shape, symbol, or representation), and each square may colored to indicate the state of the job. For example, green may indicate that the job is successful, red may indicate that the job has faulted, orange may indicate that the job is stopped, gray may indicate that the job is idle, and blue may indicate that the job is running. A user may interact with health state view 504 by selecting a job (a square) to bring up a detail window 506 showing details of the selected job (e.g., the state of the job).

Quantitative state view 508 shows the number of jobs that are in one or more states. For example, as shown in FIG. 5, quantitative state view 508 shows 32 jobs in a running state, 20 jobs in a pending state, and 12 jobs in an idle state.

Finished jobs view 510 shows a total number of finished jobs and the status of the finished jobs (e.g., successfully completed, faulted, or stopped). Finished jobs view 510 is shown in FIG. 5 in the form of a doughnut chart, but may be in any suitable form. The statuses of the finished jobs are proportionately shown in the doughnut portion of the doughnut chart. The doughnut portions of the doughnut chart may be colored to indicate the reason that the jobs finished. For example, green may indicate that the job is successful, red may indicate that the job has faulted, and orange may indicate that the job is stopped. The center of the doughnut chart depicts the total number of finished jobs.

Error feed view 512 shows various errors of the jobs and a corresponding time stamp.

Running jobs view 514 shows the number of running jobs for a time period, e.g., the past 6 months. Running jobs view 514 is shown in the form of a histogram in FIG. 5, but may be in any suitable form.

Figure 6:
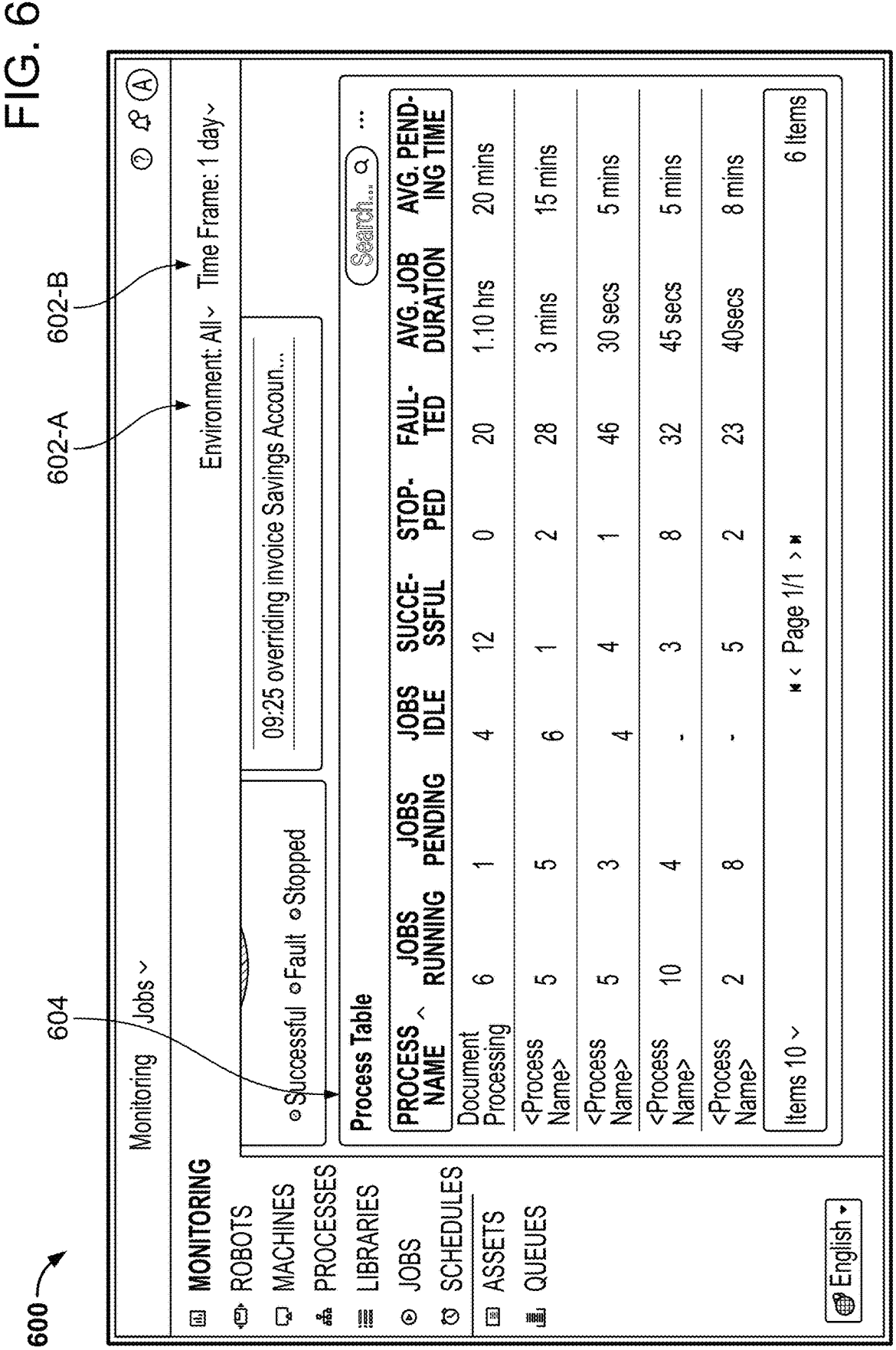
FIG. 6 shows a user interface depicting job execution data for jobs in an RPA system, according to an embodiment of the invention.

FIG. 6 shows a user interface 600 depicting job execution data for jobs in an RPA system according to workflows (also referred to as processes) of the jobs, in accordance with one or more embodiments. User interface 600 may be caused to be displayed to an end user at step 404 of method 400 of FIG. 4. The job execution data shown in user interface 600 may be filtered according to various filtering criteria, including an environment criterion 602-A and a time frame criterion 602-B.

User interface 600 depicts a process table 604 showing various workflows and metrics for each workflow. The metrics include the number of jobs running, pending, idle, successful, stopped, and faulted for each workflow, as well as the average job duration and average pending time for each workflow.

Figure 7:
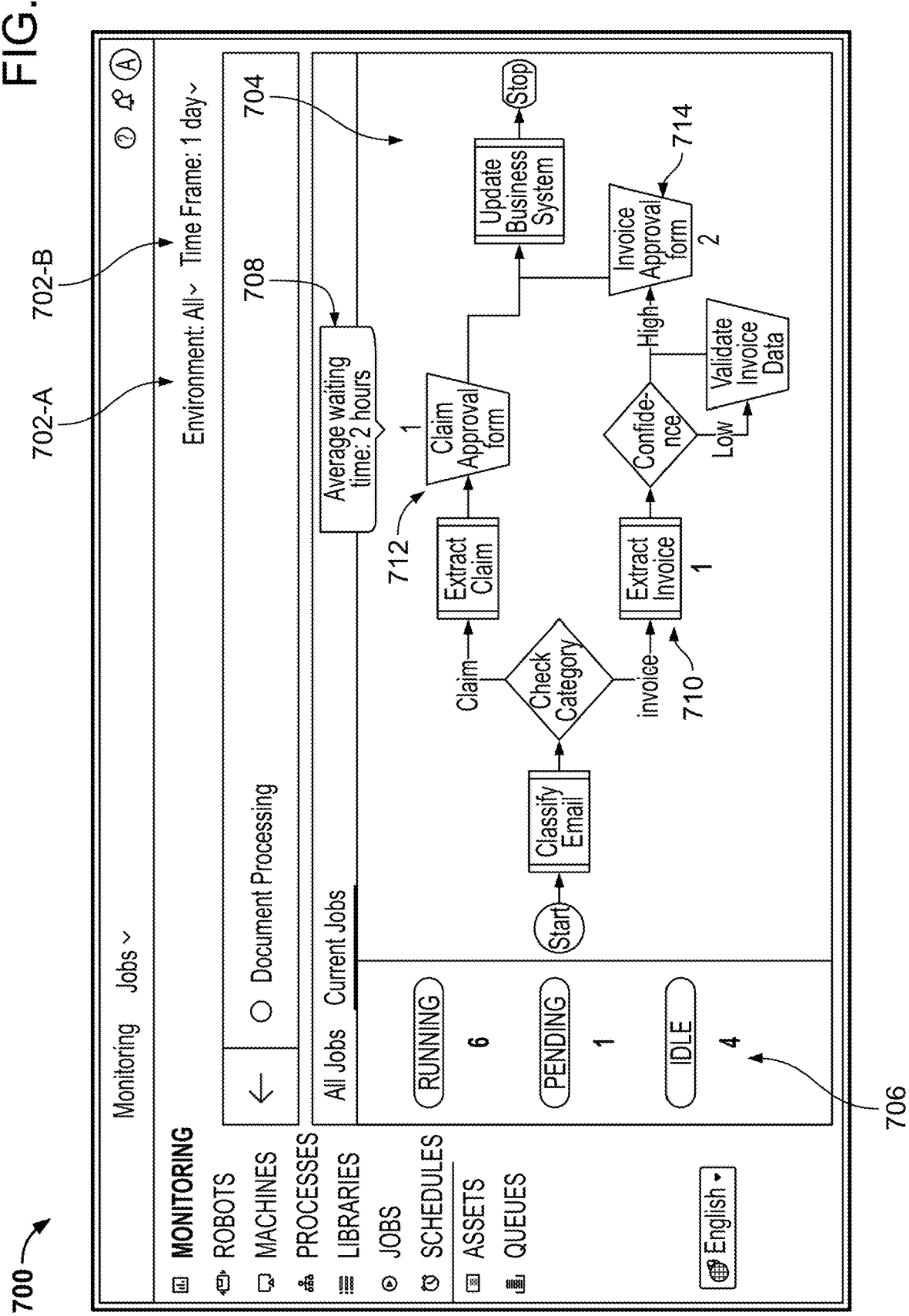
FIG. 7 shows a user interface depicting job execution data for current jobs for a document processing workflow in an RPA system, according to an embodiment of the invention.

FIG. 7 shows a user interface 700 depicting job execution data for current jobs for a document processing workflow in an RPA system, in accordance with one or more embodiments. User interface 700 may be caused to be displayed to an end user at step 404 of method 400 of FIG. 4. The job execution data shown in user interface 700 may be filtered according to various filtering criteria, including an environment criterion 702-A and a time frame criterion 702-B.

User interface 700 depicts workflow view 704 and summary view 706 for a document processing workflow (e.g., long running workflow). Summary view 706 indicates the number of current jobs associated with the document processing workflow at various states. As shown in FIG. 7, summary view 706 indicates that there are 6 running jobs, 1 pending job, and 4 idle jobs associated with the document processing workflow. Workflow view 704 depicts a visualization of the document processing workflow and numbers corresponding to activities of the document processing workflow that indicate the number of jobs idle at that activity. FIG. 7 shows 1 job idle at the extract invoice robot activity 710, 1 job idle at the claim approval form user activity 712, and 2 jobs idle at the invoice approval form user activity 714. An end user may interact with workflow view 704 by clicking on an activity and/or a number to access detail window 708 indicating the average waiting time for that activity. User interface 700 allows an end user to identify bottlenecks in the document processing workflow by identifying the activity that is causing jobs to become idle.

Figure 8:
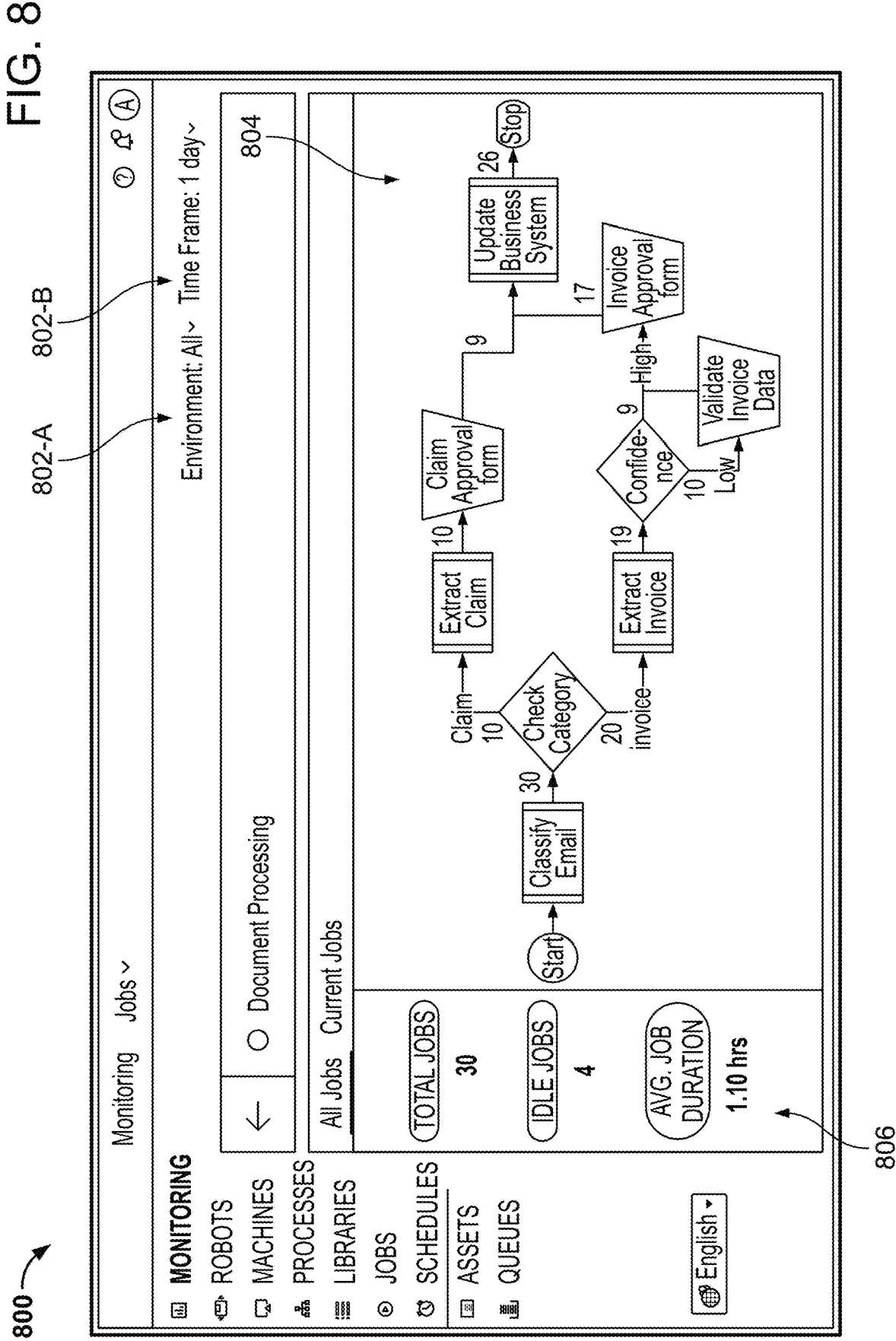
FIG. 8 shows a user interface depicting job execution data for all jobs for a document processing workflow in an RPA system, according to an embodiment of the invention.

FIG. 8 shows a user interface 800 depicting job execution data for all jobs for a document processing workflow in an RPA system, in accordance with one or more embodiments. User interface 800 may be caused to be displayed to an end user at step 404 of method 400 of FIG. 4. The job execution data shown in user interface 800 may be filtered according to various filtering criteria, including an environment criterion 802-A and a time frame criterion 802-B.

User interface 800 depicts workflow view 804 and summary view 806. Summary view 806 indicates the number of total jobs, the number of idle jobs, and the average job duration. As shown in FIG. 8, summary view 806 indicates that there are 30 total jobs, 4 idle jobs, and an average job duration of 1.10 hours. Workflow view 804 depicts a visualization of a document processing workflow (e.g., long running workflow) with a number corresponding to each path of the document processing workflow indicating the number of jobs that have traversed that path in the document processing workflow. User interface 800 allows an end user to visualize the paths taken by jobs in the document processing workflow.

Figure 9:
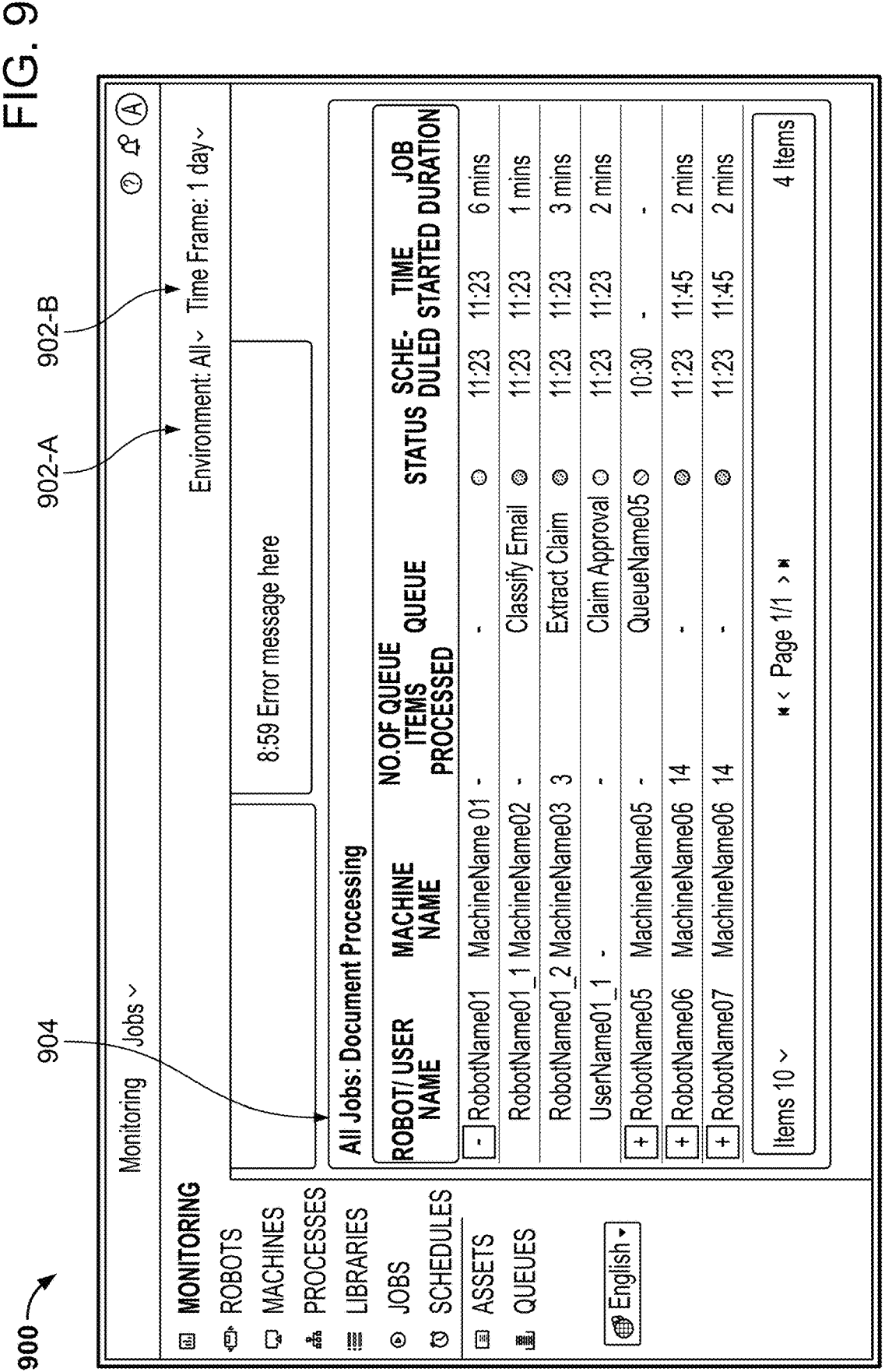
FIG. 9 shows a user interface depicting a table of job execution data all jobs for a document processing workflow in an RPA system, according to an embodiment of the invention.

FIG. 9 shows a user interface 900 depicting a table of job execution data for all jobs for a document processing workflow in an RPA system, in accordance with one or more embodiments. User interface 900 may be caused to be displayed to an end user at step 404 of method 400 of FIG. 4. The job execution data shown in user interface 900 may be filtered according to various filtering criteria, including an environment criterion 902-A and a time frame criterion 902-B.

User interface 900 depicts a tabular view 904 of all jobs executing the document processing workflow (e.g., long running workflow). As shown in FIG. 9, for each job, tabular view 904 identifies a robot or user name, a machine name (running the robot), the number of queue items processed, the queue that the job is in, the status (or state, e.g., running, pending, idle, successful, stopped, or faulted), the scheduled time of execution, the time that execution started, and the job duration.

Figure 10:
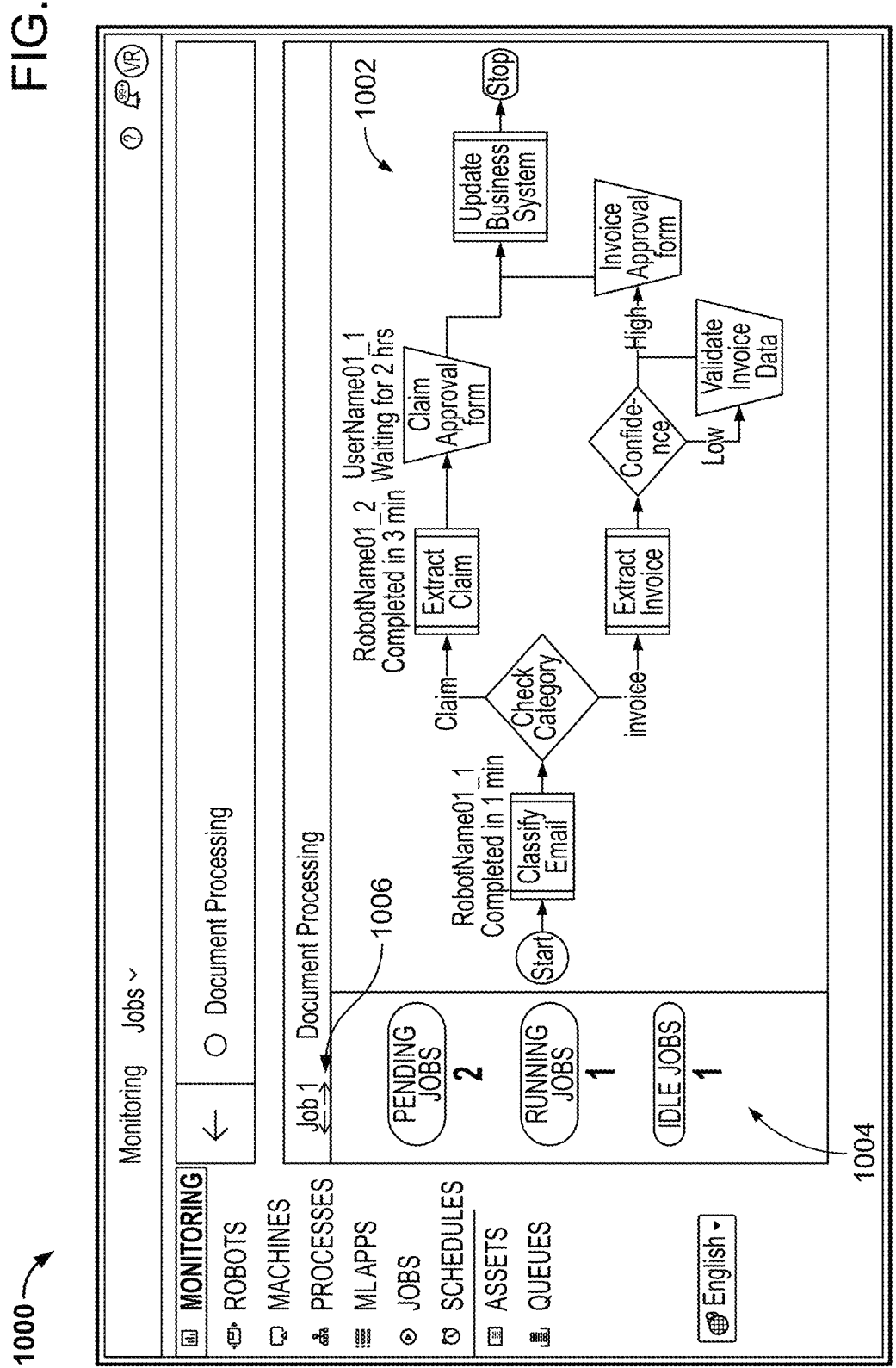
FIG. 10 shows a user interface depicting job execution data for a job executing a document processing workflow in an RPA system, according to an embodiment of the invention.

FIG. 10 shows a user interface 1000 depicting job execution data for a job (shown as Job 1 in FIG. 10) executing a document processing workflow in an RPA system, in accordance with one or more embodiments. User interface 1000 may be caused to be displayed to an end user at step 404 of method 400 of FIG. 4.

User interface 1000 depicts workflow view 1002 and summary view 1004. Summary view 1004 indicates the number of pending jobs, running jobs, and idle jobs. As shown in FIG. 10, summary view 1004 indicates that there are 2 pending jobs, 1 running job, and 1 idle job. Workflow view 1002 depicts a visualization of the document processing workflow (e.g., long running workflow) of a particular job with status information corresponding to one or more activities of the workflow for Job 1. Workflow view 1002 may show workflows for other jobs via icons 1006. For example, a user may interact with icons 1006 to show workflows for a previous job or a next job in workflow view 1002. As shown in FIG. 10, workflow view 1002 indicates that RobotName01_1 completed the classify email activity in 1 minute, RobotName01_2 completed the extract claim activity in 3 minutes, and UserName01_1 assigned to activity claim approval form and has been waiting (i.e., idle) for 2 hours. In one example, the waiting time for an activity (e.g., claim approval form) is shown if the triggering event (e.g., another job or activity) that the activity is waiting for is already assigned to another user or robot to show real-time resource bottlenecks. Accordingly, user interface 1000 identifies the path of the workflow taken for Job 1, the current status of Job 1, and the robot or user causing Job 1 to become idle.

Figure 11:
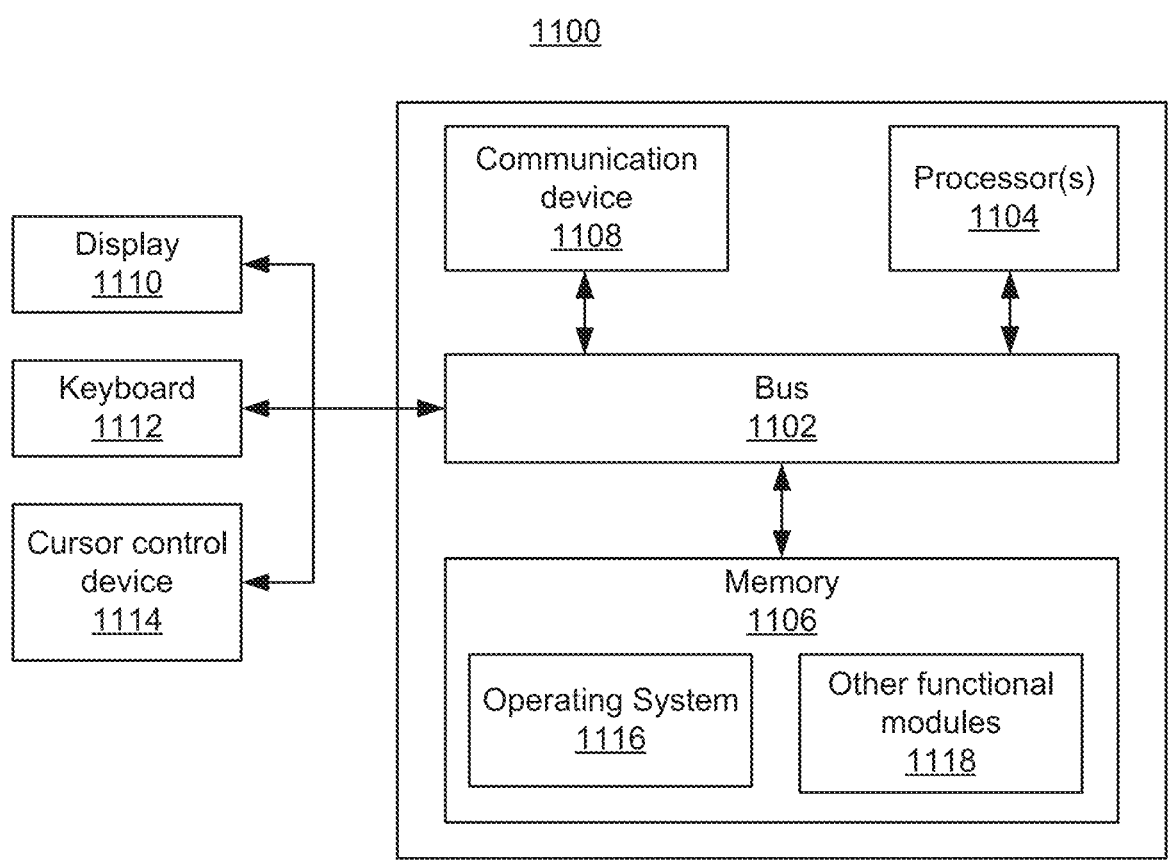
FIG. 11 is a block diagram of a computing system according to an embodiment of the invention.

FIG. 11 is a block diagram illustrating a computing system 1100 configured to execute the methods described in reference to FIG. 4, according to an embodiment of the present invention. In some embodiments, computing system 1100 may be one or more of the computing systems depicted and/or described herein. Computing system 1100 includes a bus 1102 or other communication mechanism for communicating information, and processor(s) 1104 coupled to bus 1102 for processing information. Processor(s) 1104 may be any type of general or specific purpose processor, including a Central Processing Unit (CPU), an Application Specific Integrated Circuit (ASIC), a Field Programmable Gate Array (FPGA), a Graphics Processing Unit (GPU), multiple instances thereof, and/or any combination thereof. Processor(s) 1104 may also have multiple processing cores, and at least some of the cores may be configured to perform specific functions. Multi-parallel processing may be used in some embodiments.

Computing system 1100 further includes a memory 1106 for storing information and instructions to be executed by processor(s) 1104. Memory 1106 can be comprised of any combination of Random Access Memory (RAM), Read Only Memory (ROM), flash memory, cache, static storage such as a magnetic or optical disk, or any other types of non-transitory computer-readable media or combinations thereof. Non-transitory computer-readable media may be any available media that can be accessed by processor(s) 1104 and may include volatile media, non-volatile media, or both. The media may also be removable, non-removable, or both.

Additionally, computing system 1100 includes a communication device 1108, such as a transceiver, to provide access to a communications network via a wireless and/or wired connection according to any currently existing or future-implemented communications standard and/or protocol.

Processor(s) 1104 are further coupled via bus 1102 to a display 1110 that is suitable for displaying information to a user. Display 1110 may also be configured as a touch display and/or any suitable haptic I/O device.

A keyboard 1112 and a cursor control device 1114, such as a computer mouse, a touchpad, etc., are further coupled to bus 1102 to enable a user to interface with computing system. However, in certain embodiments, a physical keyboard and mouse may not be present, and the user may interact with the device solely through display 1110 and/or a touchpad (not shown). Any type and combination of input devices may be used as a matter of design choice. In certain embodiments, no physical input device and/or display is present. For instance, the user may interact with computing system 1100 remotely via another computing system in communication therewith, or computing system 1100 may operate autonomously.

Memory 1106 stores software modules that provide functionality when executed by processor(s) 1104. The modules include an operating system 1116 for computing system 1100 and one or more additional functional modules 1118 configured to perform all or part of the processes described herein or derivatives thereof.

One skilled in the art will appreciate that a "system" could be embodied as a server, an embedded computing system, a personal computer, a console, a personal digital assistant (PDA), a cell phone, a tablet computing device, a quantum computing system, or any other suitable computing device, or combination of devices without deviating from the scope of the invention. Presenting the above-described functions as being performed by a "system" is not intended to limit the scope of the present invention in any way, but is intended to provide one example of the many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like. A module may also be at least partially implemented in software for execution by various types of processors. An identified unit of executable code may, for instance, include one or more physical or logical blocks of computer instructions that may, for instance, be organized as an object, procedure, or function. Nevertheless, the executables of an identified module need not be physically located together, but may include disparate instructions stored in different locations that, when joined logically together, comprise the module and achieve the stated purpose for the module. Further, modules may be stored on a computer-readable medium, which may be, for instance, a hard disk drive, flash device, RAM, tape, and/or any other such non-transitory computer-readable medium used to store data without deviating from the scope of the invention. Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

The foregoing merely illustrates the principles of the disclosure. It will thus be appreciated that those skilled in the art will be able to devise various arrangements that, although not explicitly described or shown herein, embody the principles of the disclosure and are included within its spirit and scope. Furthermore, all examples and conditional language recited herein are principally intended to be only for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future.

What is claimed is:

1. A computer-implemented method for monitoring a robotic process automation (RPA) system, comprising:
    determining job execution data for one or more jobs in the RPA system based on logs of the RPA system; and
    causing display, in a visualization of a workflow associated with the one or more jobs, of the job execution data that corresponds to one or more paths of the workflow and of the job execution data that corresponds to one or more activities of the workflow.

2. The computer-implemented method of claim 1, wherein causing display, in a visualization of a workflow associated with the one or more jobs, of the job execution data that corresponds to one or more paths of the workflow and of the job execution data that corresponds to one or more activities of the workflow comprises:
    causing display of a number of idle jobs for an activity of the workflow.

3. The computer-implemented method of claim 1, wherein causing display, in a visualization of a workflow associated with the one or more jobs, of the job execution data that corresponds to one or more paths of the workflow and of the job execution data that corresponds to one or more activities of the workflow comprises:
    causing display of a number of jobs that have traversed one or more paths of the workflow.

4. The computer-implemented method of claim 1, wherein causing display, in a visualization of a workflow associated with the one or more jobs, of the job execution data that corresponds to one or more paths of the workflow and of the job execution data that corresponds to one or more activities of the workflow comprises:
    causing display of a name of a robot assigned to perform an activity of the workflow.

5. The computer-implemented method of claim 1, wherein causing display, in a visualization of a workflow associated with the one or more jobs, of the job execution data that corresponds to one or more paths of the workflow and of the job execution data that corresponds to one or more activities of the workflow comprises:
    causing display of a completion time of an activity of the workflow.

6. The computer-implemented method of claim 1, wherein causing display, in a visualization of a workflow associated with the one or more jobs, of the job execution data that corresponds to one or more paths of the workflow and of the job execution data that corresponds to one or more activities of the workflow comprises:
    causing display of an idle time of an activity of the workflow.

7. The computer-implemented method of claim 1, wherein causing display, in a visualization of a workflow associated with the one or more jobs, of the job execution data that corresponds to one or more paths of the workflow and of the job execution data that corresponds to one or more activities of the workflow comprises:

causing display of a color for each respective job, the color for the respective job corresponding to a state of the respective job.

8. The computer-implemented method of claim 1, wherein causing display, in a visualization of a workflow associated with the one or more jobs, of the job execution data that corresponds to one or more paths of the workflow and of the job execution data that corresponds to one or more activities of the workflow comprises:

causing display of the job execution data for the one or more jobs in the RPA system in substantially real time.

9. The computer-implemented method of claim 1, wherein the determining and the causing are performed by one or more computing devices implemented in a cloud computing system.

10. A system for monitoring a robotic process automation (RPA) system comprising:

a memory storing computer instructions; and at least one processor configured to execute the computer instructions, the computer instructions configured to cause the at least one processor to perform operations of:

determining job execution data for one or more jobs in the RPA system based on logs of the RPA system; and causing display, in a visualization of a workflow associated with the one or more jobs, of the job execution data that corresponds to one or more paths of the workflow and of the job execution data that corresponds to one or more activities of the workflow.

11. The system of claim 10, wherein causing display, in a visualization of a workflow associated with the one or more jobs, of the job execution data that corresponds to one or more paths of the workflow and of the job execution data that corresponds to one or more activities of the workflow comprises:

causing display of a number of idle jobs for an activity of the workflow.

12. The system of claim 10, wherein causing display, in a visualization of a workflow associated with the one or more jobs, of the job execution data that corresponds to one or more paths of the workflow and of the job execution data that corresponds to one or more activities of the workflow comprises:

causing display of a number of jobs that have traversed one or more paths of the workflow.

13. The system of claim 10, wherein causing display, in a visualization of a workflow associated with the one or more jobs, of the job execution data that corresponds to one or more paths of the workflow and of the job execution data that corresponds to one or more activities of the workflow comprises:

causing display of a name of a robot assigned to perform an activity of the workflow.

14. The system of claim 10, wherein causing display, in a visualization of a workflow associated with the one or more jobs, of the job execution data that corresponds to one or more paths of the workflow and of the job execution data that corresponds to one or more activities of the workflow comprises:

causing display of a completion time of an activity of the workflow.

15. The system of claim 10, wherein causing display, in a visualization of a workflow associated with the one or more jobs, of the job execution data that corresponds to one or more paths of the workflow and of the job execution data that corresponds to one or more activities of the workflow comprises:

causing display of an idle time of an activity of the workflow.

16. The system of claim 10, wherein causing display, in a visualization of a workflow associated with the one or more jobs, of the job execution data that corresponds to one or more paths of the workflow and of the job execution data that corresponds to one or more activities of the workflow comprises:

causing display of a color for each respective job, the color for the respective job corresponding to a state of the respective job.

17. The system of claim 10, wherein causing display, in a visualization of a workflow associated with the one or more jobs, of the job execution data that corresponds to one or more paths of the workflow and of the job execution data that corresponds to one or more activities of the workflow comprises:

causing display of the job execution data for the one or more jobs in the RPA system in substantially real time.

18. The system of claim 10, wherein the system is implemented in a cloud computing system.

19. A non-transitory computer-readable medium storing computer program instructions for monitoring a robotic process automation (RPA) system, the computer program instructions when executed by at least one processor, cause the at least one processor to perform operations comprising:

determining job execution data for one or more jobs in the RPA system based on logs of the RPA system; and causing display, in a visualization of a workflow associated with the one or more jobs, of the job execution data that corresponds to one or more paths of the workflow and of the job execution data that corresponds to one or more activities of the workflow.

20. The non-transitory computer-readable medium of claim 19, wherein causing display, in a visualization of a workflow associated with the one or more jobs, of the job execution data that corresponds to one or more paths of the workflow and of the job execution data that corresponds to one or more activities of the workflow comprises:

causing display of a number of idle jobs for an activity of the workflow.

21. The non-transitory computer-readable medium of claim 19, wherein causing display, in a visualization of a workflow associated with the one or more jobs, of the job execution data that corresponds to one or more paths of the workflow and of the job execution data that corresponds to one or more activities of the workflow comprises:

causing display of a number of jobs that have traversed one or more paths of the workflow.

22. The non-transitory computer-readable medium of claim 19, wherein causing display, in a visualization of a workflow associated with the one or more jobs, of the job execution data that corresponds to one or more paths of the workflow and of the job execution data that corresponds to one or more activities of the workflow comprises:

causing display of a name of a robot assigned to perform an activity of the workflow.

23. The non-transitory computer-readable medium of claim 19, wherein causing display, in a visualization of a workflow associated with the one or more jobs, of the job execution data that corresponds to one or more paths of the workflow and of the job execution data that corresponds to one or more activities of the workflow comprises:

causing display of a completion time of an activity of the workflow.

24. The non-transitory computer-readable medium of claim 19, wherein causing display, in a visualization of a workflow associated with the one or more jobs, of the job execution data that corresponds to one or more paths of the workflow and of the job execution data that corresponds to one or more activities of the workflow comprises:

causing display of an idle time of an activity of the workflow.

25. The non-transitory computer-readable medium of claim 19, wherein causing display, in a visualization of a workflow associated with the one or more jobs, of the job execution data that corresponds to one or more paths of the workflow and of the job execution data that corresponds to one or more activities of the workflow comprises:

causing display of a color for each respective job, the color for the respective job corresponding to a state of the respective job.

26. The non-transitory computer-readable medium of claim 19, wherein causing display, in a visualization of a workflow associated with the one or more jobs, of the job execution data that corresponds to one or more paths of the workflow and of the job execution data that corresponds to one or more activities of the workflow comprises:

causing display of the job execution data for the one or more jobs in the RPA system in substantially real time.

27. The non-transitory computer-readable medium of claim 19, wherein the at least one processor is implemented in one or more computing devices and the one or more computing devices are implemented in a cloud computing system.

* * * * *